United States Patent

Zwijnenburg et al.

[11] Patent Number: 5,833,854
[45] Date of Patent: Nov. 10, 1998

[54] SEMIPERMEABLE COMPOSITE MEMBRANE AND A METHOD FOR THE PREPARATION OF SUCH A MEMBRANE

[75] Inventors: Arie Zwijnenburg, Oldekerk; Jan Willem De Rijk, Drachten; Casper J. N. Rekers, Hardenberg, all of Netherlands

[73] Assignee: Stork Friesland BV, Gorredijk, Netherlands

[21] Appl. No.: 768,300

[22] Filed: Dec. 17, 1996

[30] Foreign Application Priority Data

Dec. 21, 1995 [NL] Netherlands .................... 1001973

[51] Int. Cl.$^6$ .................................................. B01D 39/00
[52] U.S. Cl. .............. 210/500.37; 210/490; 210/500.27; 210/500.38; 427/244; 427/245; 264/45.1
[58] Field of Search ............... 210/500.21, 500.27, 210/500.37, 500.38, 490; 427/244, 245; 264/41, 45.1

[56] References Cited

U.S. PATENT DOCUMENTS

| | | | |
|---|---|---|---|
| 3,951,815 | 4/1976 | Wrasidlo | 210/490 |
| 4,388,189 | 6/1983 | Kawaguchi et al. | 210/490 |
| 4,631,337 | 12/1986 | Tomalia et al. | 210/500.37 |
| 4,721,568 | 1/1988 | Buys et al. | 210/500.37 |
| 4,812,270 | 3/1989 | Cadotte et al. | 210/500.38 |
| 4,824,574 | 4/1989 | Cadotte et al. | 210/654 |
| 4,828,708 | 5/1989 | Bray | 210/490 |
| 4,859,384 | 8/1989 | Fibiger et al. | 264/45.1 |
| 4,876,009 | 10/1989 | McCray | 210/500.37 |
| 4,885,091 | 12/1989 | Swedo et al. | 210/500.37 |
| 4,964,998 | 10/1990 | Cadotte et al. | 210/500.38 |

FOREIGN PATENT DOCUMENTS

| | | |
|---|---|---|
| WO93/14147 | 7/1993 | WIPO . |
| WO95/02008 | 1/1995 | WIPO . |
| WO/95/20619 | 8/1995 | WIPO . |

OTHER PUBLICATIONS

Angew. Chem, Int. Ed. Engl. vol. 32, No. 9, 1993, Weinheim, DE, pp. 1308–1311 XP002011651.

*Primary Examiner*—Ana Fortuna
*Attorney, Agent, or Firm*—Quarles & Brady

[57] ABSTRACT

The invention relates to a semipermeable composite membrane comprising a microporous substrate provided with a semipermeable microporous substrate membrane which is provided, on at least one side, with a water-permeable polymer layer, said polymer layer containing the interfacial-polymerization product of an amine-terminal dendrimer and a compound polymerizing therewith. According to the invention, the amine-terminal dendrimers used, are poly (alkylene imine) dendrimers. These dendrimers preferably have terminal primary and/or secondary amine groups. In particular, use is made of a 1,4-diaminobutane [4]: (1-azabutylidene)$^{x-4}$: propylamine or propyl-N-alkyl-amine, wherein x=4, 8, 16, 32 or 64. Expediently, the compound which polymerizes with the dendrimer is selected from the group consisting of a carboxylic acid or carboxylic acid derivative, a sulphonic acid or sulphonic acid derivative, and an isocyanate compound. The invention also relates to a method for the preparation of such a semipermeable composite membrane.

39 Claims, 1 Drawing Sheet

FLUS VERSUS pH OF COMPOSITE MEMBRANES

1. Membrane according to the invention
2. Membrane according to NL-A-8402674 (corresponding with U.S. 4,721,568)

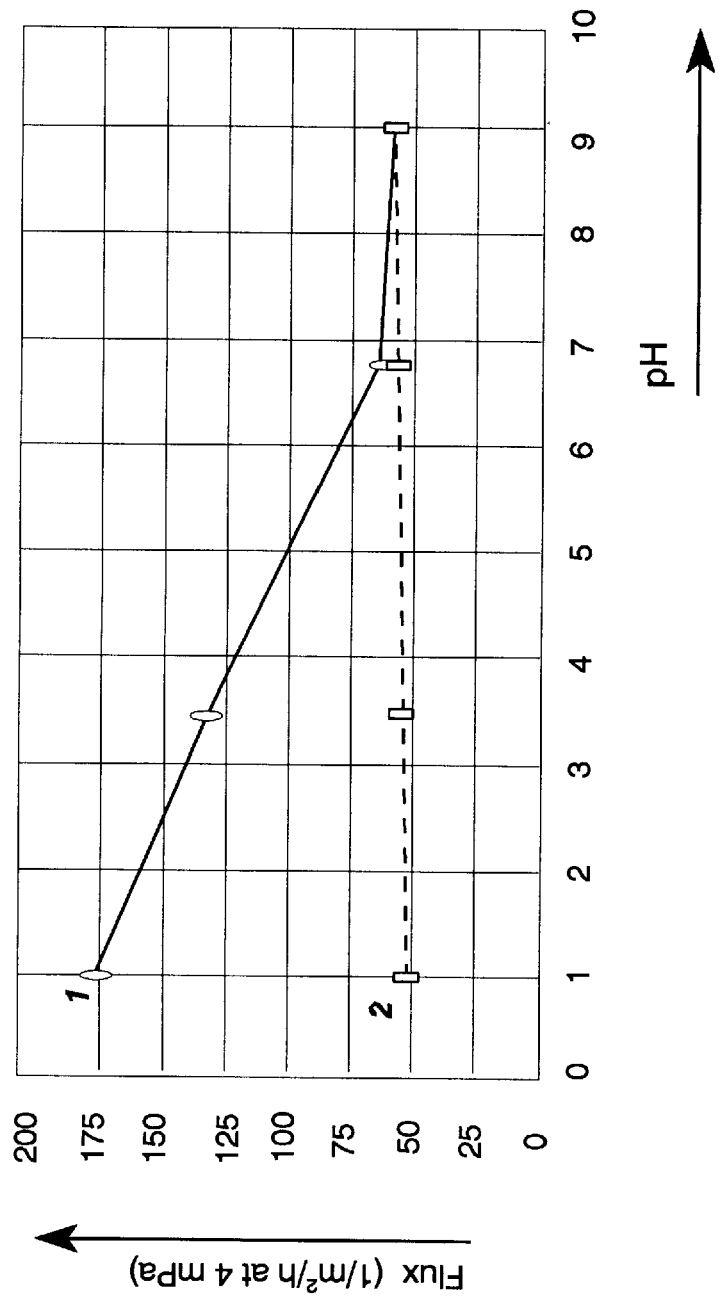

SEMIPERMEABLE COMPOSITE MEMBRANE AND A METHOD FOR THE PREPARATION OF SUCH A MEMBRANE

BACKGROUND OF THE INVENTION

The invention relates to a semipermeable composite membrane comprising a microporous substrate provided with a semipermeable microporous substrate membrane which is provided, on at least one side, with a water-permeable polymer layer.

Such a membrane is disclosed in U.S. Pat. No. 4,885,091. More in particular, this publication relates to a clorine-resistant semipermeable membrane which has a polyamide layer formed by interfacial condensation of an aromatic carboxylic acid chloride with an aromatic polyamine which has a chlorine substituent on the aromatic ring and is selected from 4-chloro-m-phenylenediamine, 5-chloro-m-phenylenediamine. Such a membrane is suitable for the desalination of brackish water or sea water.

A composite membrane of the abovementioned type is also disclosed in U.S. Pat. No. 4,876,009, the polymer layer containing the reaction product of a tetrakis-aminomethyl compound having the formula C (NHMe)$_4$ with an aromatic polyacyl halide having the formula Ar(COX)$_n$, in which Me: methyl, Ar: aryl, X: halide and n=2 or 3.

A composite membrane comprising a microporous substrate and a polymer layer applied thereto is also known from U.S. Pat. No. 4,828,708, the polymer layer having been formed by interfacial condensation of an aromatic polycarboxylic acid and a mixture of isophthaloyl chloride and trimesoyl chloride. Such a membrane can be used in reverse-osmosis systems.

SUMMARY OF THE INVENTION

A novel group of semipermeable composite membranes has now been found, which are provided with a polymer layer of such a composition that the membrane can be used for reverse osmosis or nanofiltration purposes.

The semipermeable composite membrane according to the invention is characterized in that the polymer layer comprises the interfacial-polymerization product of an amine-terminal dendrimer and a compound polymerizing therewith.

It should be noted that the term dendrimer refers to a macromolecule which has an even higher concentration of functional groups per unit volume of the polymer macromolecule, and also a more uniform distribution of these functional polymers in the external regions of the macromolecule than is the case with other known star-shaped polymers.

Expediently, according to the invention, poly (alkylenimine) dendrimers are used as amine-terminal dendrimers. These dendrimers preferably have terminal primary and/or secondary amine groups.

The polymer layer in the composite membrane according to the invention is preferably based on an amine-terminal poly(iminopropane-1,3-diyl) dendrimer, more in particular a 1,4-diaminobutane [4]: (1-azabutylidene)$^{x-4}$: propylamine or propyl-N-alkyl-amine, wherein x=4, 8, 16, 32 or 64.

Reverse-osmosis composite membranes of this composition have a flux of at least 40 l/m$^2$.h and a salt retention of at least 95% under standard condition.

Expediently, the compound which polymerizes with the dendrimer is selected from the group consisting of a carboxylic acid or carboxylic acid derivative, a sulphonic acid or sulphonic acid derivative, and an isocyanate compound, being reactive with an amine.

The carboxylic acid derivative used is selected, according to an expedient embodiment of the invention, from the group consisting of isophthaloyl chloride, tere-phthaloyl chloride, trimesoyl chloride and thiadiazole polyacid derivatives such as thiadiazoledicarboxylic acid halides. The thiadiazoledicarboxylic acid halide used is preferably 1,2,5-thiadiazole-3,4-dicarboxylic acid chloride. Obviously it is also possible to use other polyfunctional acid halides, such as, for example, thionyl chloride.

If a sulphonic acid derivative is used, this is preferably selected from the di- or trifunctional sulphonyl chlorides, in particular 1,3,5-benzenetrisulphonyl chloride or 4,4'-diphenyldisulphonyl chloride.

Instead of a carboxylic acid derivative or sulphonic acid derivative it is also possible, however, to use a polyfunctional isocyanate compound, such as toluene diisocyanate.

The semipermeable microporous substrate membrane for the top layer is preferably a polysulphone membrane, a polyethersulphone membrane, a polyacrylonitrile membrane or a poly(vinylidene fluoride) membrane. This list should not, however, be regarded as limiting. Substrate membranes formed from polycarbonate, polyamides, copoly-mers of acrylonitrile and vinyl chloride, polyacetal, polyacrylates, polyelectrolyte complexes and crosslinked poly(vinyl alcohols) can likewise be used, as can the membranes formed, for example, from cellulose nitrate, cellulose acetate, acrylic copolymers, poly(vinyl chloride) and poly-tetrafluoroethylene.

Expediently, the semipermeable substrate membrane has a layer thickness from 20 to 200 μm, in particular about 100 μm. The polyamide top layer, in contrast, is preferably ultrathin, i.e. has a thickness of from 0.05 to 1.0 μm.

The invention further relates to a method for the preparation of a semipermeable composite membrane, at least one surface of a substrate material being provided with a water-permeable polymer layer.

Such a method is disclosed in U.S. Pat. No. 4,885,091. The polyamide top layer formed in this case is formed, however, by interfacial polymerization of 4- (or 5-)chloro-m-phenylenediamine with an aromatic polycarboxylic acid chloride.

According to the method according to the invention, a polymer layer is formed, however, by means of an interfacial polymerization reaction from an aliphatic amine-terminal dendrimer and a compound polymerizing therewith.

The terminal amine groups of the dendrimer involved can be primary or secondary or a combination thereof.

Preferably, the dendrimer used is a poly(alkylenimine) dendrimer, in particular a poly(propylenimine) dendrimer.

A poly(propylenimine) dendrimer having primary terminal amine groups can be obtained, for example, by 1,4-diaminobutane being reacted with acrylonitrile, as described in WO 95/02008. By means of reductive alkylation, such a dendrimer can be converted, in part or in its entirety, into dendrimers having secondary terminal amine groups.

Preferably, the dendrimer used is a 1,4-diaminobutane [4]: (1-azabutylidene)$^{x-4}$: propylamine or propyl-N-alkyl-amine, wherein x=4, 8, 16, 32 or 64.

The compound which polymerizes with the dendrimer is preferably selected from the group consisting of a carboxylic acid or carboxylic acid derivative, a sulphonic acid or sulphonic acid derivative, and an isocyanate compound, being reactive with an amine.

The carboxylic acid derivative to be used according to the invention is expediently isophthaloyl chloride, terephthaloyl chloride, trimesoyl chloride or a thiadiazole polyacid derivative such as a thiadiazole dicarboxylic acid halide, in particular 1,2,5-thiadiazole-3, 4-dicarboxylic acid chloride.

The sulphonic acid derivative to be used according to the method of the invention is expediently selected from the di- and trifunctional sulphonyl chlorides, preferably 1,3,5-benzenetrisulphonyl chloride or 4,4'-(phenoxybenzene)-disulphonyl chloride or 4,4'-diphenyldisulphonyl chloride.

The isocyanate compound to be used according to the method of the invention expediently is an aromatic isocyanate, preferably toluene diisocyanate.

The semipermeable substrate membrane used is preferably a polysulphone membrane, a polyethersulphone membrane, a polyacrylonitrile membrane or a poly(vinylidene fluoride) membrane. This list should not, however, be seen as limiting, other polymers can likewise be used as explained hereinabove.

The invention further relates to the use of a 1,4-diaminobutane [4]: (1-azabutylidene)$^{x-4}$: propylamine or propyl-N-alkyl-amine dendrimer, wherein x=4, 8, 16, 32 or 64 for the preparation of a composite membrane.

Such a composite membrane can be used, in particular, as a membrane for nanofiltration or for reverse osmosis.

Surprisingly it was found that the composite membranes according to the invention, when the pH is lowered (pH<5), exhibit higher fluxes, compared with known membranes, while the retention remained comparable.

It should be noted that the invention is not limited to a particular type of membrane but that any type can be used such as a flat membrane, hollow fibre membrane or tubular membrane.

BRIEF DESCRIPTION OF FIGURE

The sole figure represents the effect of pH in membrane flux for the membrane of the invention and a known membrane.

DETAILED DESCRIPTION

The invention will now be illustrated by means of a number of exemplary embodiments.

Example 1

Two asymmetric, microporous tubular polysulphone substrate membranes having a length of 2 meters were submerged in a 0.25 wt % aqueous solution of DAB-dendri-(NH$_2$)$_8$(=DAB-8, brand name of DSM Fine Chemicals B.V., Sittard, NL, for a diaminobutane (amine)$^8$ dendrimer), to which 0.1 wt % of sodium dodecylsulphate (SDS) had been added as a surfactant.

The excess solution was allowed to drip off the substrate membranes. They were then immersed for 30 seconds at room temperature in a 0.5 wt % solution of trimesoyl chloride (TMC) in hexane. This resulted in the formation of a thin polyamide film on the microporous surface of the polysulphone substrate. The composite membranes obtained then underwent a heat treatment in an oven for 10 min at 80° C.

The membranes thus formed were tested in testing modules having a length of 1.8 meters at a pressure of 40 bar and a temperature of 25° C., at pH=6, with water containing 0.35% of NaCl.

The test results showed an average flux of 64 l/m$^2$.h and an average NaCl retention of 98%.

Example 2

Two different composite membranes were prepared in the same way as in Example 1, except that instead of a solution containing 0.25% of DAB-8, an aqueous solution was used which contained 0.75 wt % of DAB-8, 0.5 wt % of poly(vinylmethylamine) (PVMA) and 0.02% of sodium dodecyl sulphate (SDS).

Test results of these membranes, at pH 6.5 and 25° C., gave an average flux of 84 l/m$^2$.h at 40 bar with an NaCl retention of 98.0%.

The use of poly(ethylenimine) (PEI) instead of PVMA gave similar results.

Example 3

This example relates to the use of DAB-dendri-(NH$_2$)$_4$ (=DAB-4; 1,4-diaminobutane[4]: propylamine).

Two composite membranes were prepared in essentially the same way as in Examples 1 and 2.

The aqueous solution in this case contained 0.75 wt % of DAB-4 (brand name of DSM Fine Chemicals), 0.5 wt % of PVMA and 0.02 wt % of sodium dodecylsulphate (SDS), and the organic solution contained 1.6 wt % of isophthaloyl chloride (IPC) and 0.06% of trimesoyl chloride (TMC).

Test results under the abovementioned conditions gave an average flux of 40 l/m$^2$.h and an NaCl retention of 98.9%.

Example 4

This example illustrates both the effect of the pH of the liquid to be treated on the flux and the NaCl retention values of membranes.

Membranes according to Example 2 show the following behaviour as a function of pH:

| | Flux (1/m$^2$.h)/Retention |
|---|---|
| pH 4.4 | 147/95.4% |
| pH 6.5 | 84/98.0% |
| pH 10.9 | 58/88.3% |

Composite membranes according to the invention therefore, surprisingly, exhibit a special behaviour in their reaction with respect to the degree of acidity of the liquid to be treated. It was found that, in particular, there is a strong effect with respect to the water flux. Thus, when the pH is lowered (pH<5) an unexpectedly larger flux is found to occur with such membranes, compared with conventional membranes, while the effect of the degree of acidity on the retention value is limited.

For example, in the accompanying figure a membrane according to the invention has been compared with a WFC 0995 membrane, as described in NL-A-84.02647 (corresponding with U.S. Pat. No. 4,721,568).

A membrane according to the invention is therefore particularly suitable for treating acidic feeds.

What is claimed is:

1. A semipermeable composite membrane comprising a semipermeable microporous substrate membrane which is provided, on at least one surface, with a water-permeable polymer layer, wherein said polymer layer comprises the interfacial-polymerization product of an amine-terminal dendrimer and a compound polymerizing therewith.

2. A semipermeable composite membrane according to claim 1, wherein said amine-terminal dendrimer is a poly(alkylenimine) dendrimer.

3. A semipermeable composite membrane according to claim 1, wherein said amine-terminal dendrimer is a poly(alkylenimine) dendrimer having primary amine groups.

4. A semipermeable composite membrane according to claim 3, wherein said poly(alkylenimine) dendrimer having primary amine groups is a propylenimine dendrimer having primary amine groups.

5. A semipermeable composite membrane according to claim 1, wherein said amine-terminal dendrimer is a poly(alkylenimine) having secondary amine groups.

6. A semipermeable composite membrane according to claim 5, wherein said poly(alkylenimine) dendrimer having secondary amine groups is a propylenimine dendrimer having secondary amine groups.

7. A semipermeable composite membrane according to claim 1, wherein said dendrimer is a 1,4-diaminobutane [4]: (1-azabutylidene)$^{x-4}$: propylamine, wherein x=4, 8, 16, 32 or 64.

8. A semipermeable composite membrane according to claim 1, wherein said dendrimer is a 1,4-diaminobutane [4]: (1-azabutylidene)$^{x-4}$: propyl-N-alkylamine, wherein x=4, 8, 16, 32 or 64.

9. A semipermeable composite membrane according to claim 1, wherein said compound which polymerizes with said dendrimer is selected from the group consisting of a carboxylic acid, a carboxylic acid derivative, a sulphonic acid, a sulphonic acid derivative, and an isocyanate compound.

10. A semipermeable composite membrane according to claim 9, wherein said carboxylic acid derivative is selected from the group consisting of isophthaloyl chloride, terephthaloyl chloride, trimesoyl chloride and thiadiazole polyacid derivatives.

11. A semipermeable composite membrane according to claim 10, wherein said thiadiazole polyacid derivatives are selected from the thiadiazoledicarboxylic acid halides.

12. A semipermeable composite membrane according to claim 11, wherein said thiadiazole polyacid derivatives consist of 1,2,5-thiadiazole-3,4-dicarboxylic acid chloride.

13. A semipermeable composite membrane according to claim 9, wherein said sulphonic acid derivative is selected from the group consisting of di- and trifunctional sulphonyl chlorides.

14. A semipermeable composite membrane according to claim 13, wherein said sulphonic acid derivative consists of 1,3,5-benzenetrisulphonyl chloride,4,4'-(phenoxybenzene) disulphonyl chloride.

15. A semipermeable composite membrane according to claim 13, wherein said sulphonic acid derivative consists of 1,3,5-benzenetrisulphonyl chloride,4,4'-diphenyldisulphonyl chloride.

16. A semipermeable composite membrane according to claim 9, wherein said isocyanate compound is an aromatic isocyanate.

17. A semipermeable composite membrane according to claim 16, wherein said isocyanate compound consists of toluene diisocyanate.

18. A semipermeable composite membrane according to claim 1, wherein said semipermeable substrate membrane is selected from the group consisting of a polysulphone membrane, a polyethersulphone membrane, a polyacrylonitrile membrane and a poly(vinylidene fluoride) membrane.

19. A semipermeable composite membrane according to claim 1, wherein said semipermeable substrate membrane has a thickness of from 20 to 200 $\mu$m, and the water-permeable polymer layer has a thickness of from 0.05 to 1 $\mu$m.

20. A semipermeable composite membrane according to claim 19, wherein said semipermeable substrate membrane has a thickness of about 100 $\mu$m.

21. A semipermeable composite membrane according to claim 1, wherein said membrane is a reverse osmosis membrane which exhibits a flux of at least 120 l/m$^2$.h and an NaCl retention of at least 95% for a pH of the feed of less than 5.0.

22. A method for the preparation of a semipermeable composite membrane which involves the step of providing a semipermeable substrate membrane, on at least one surface, with a water-permeable polymer layer, wherein said polymer layer is formed by means of an interfacial polymerization reaction between an amine-terminal dendrimer and a compound polymerizing therewith.

23. A method according to claim 22, wherein said amine-terminal dendrimer is a poly(alkylenimine) dendrimer.

24. A method according to claim 22, wherein said amine-terminal dendrimer is a poly(alkylenimine) dendrimer having primary amine groups.

25. A method according to claim 24, wherein said amine-terminal poly(alkylenimine) dendrimer having primary amine groups is a propylenimine dendrimer having primary amine groups.

26. A method according to claim 22, wherein said amine-terminal dendrimer is a poly(alkylenimine) dendrimer having secondary amine groups.

27. A method according to claim 26, wherein said poly(alkylenimine) dendrimer having secondary amine groups is a propylenimine dendrimer having secondary amine groups.

28. A method according to claim 22, wherein said dendrimer is a 1,4-diaminobutane [4]: (1-azabutylidene)$^{x-4}$: propylamine, wherein x=4, 8, 16, 32 or 64.

29. A method according to claim 22, wherein said dendrimer is a 1,4-diaminobutane [4]: (1-azabutylidene)$^{x-4}$: propyl-N-alkylamine, wherein x=4, 8, 16, 32 or 64.

30. A method according to claim 22, wherein said compound which polymerizes with the dendrimer is selected from the group consisting of a carboxylic acid or carboxylic acid derivative, a sulphonic acid or sulphonic acid derivative, and an isocyanate compound.

31. A method according to claim 30, wherein said carboxylic acid derivative is selected from the group consisting of isophthaloyl chloride, terephthaloyl chloride, trimesoyl chloride and thiadiazole polyacid derivatives.

32. A method according to claim 31, wherein said thiadiazole polyacid derivatives are selected from the thiadiazoledicarboxylic acid halides.

33. A method according to claim 32, wherein said thiadiazole polyacid derivatives consist of 1,2,5-thiadiazole-3,4-dicarboxylic acid chloride.

34. A method according to claim 30, wherein said sulphonic acid derivative is selected from the group consisting of the di- and trifunctional sulphonyl chlorides.

35. A method according to claim 34, wherein said sulphonic acid derivative consists of 1,3,5-benzenetrisulphonyl chloride, 4,4'-(phenoxybenzene)-disulphonyl chloride.

36. A method according to claim 34, wherein said sulphonic acid derivative consists of 1,3,5-benzenetrisulphonyl chloride, 4,4'-diphenyldisulphonyl chloride.

37. A method according to claim 30, wherein said isocyanate compound is an aromatic isocyanate.

38. A method according to claim 37, wherein said isocyanate compound consists of toluene diisocyanate.

39. A method according to claim 22, wherein said semipermeable substrate membrane used is selected from the group consisting of a polysulphone membrane, a polyethersulphone membrane, a polyacrylonitrile membrane and a poly(vinylidene fluoride) membrane.

* * * * *